(No Model.)

J. OWEN.
FRUIT RECEPTACLE.

No. 282,215. Patented July 31, 1883.

ATTEST:
J. A. Mundle
J. W. Leaman

INVENTOR:
Joseph Owen
By T. E. Newell
his attorney

N. PETERS, Photo-Lithographer, Washington, D. C.

UNITED STATES PATENT OFFICE.

JOSEPH OWEN, OF NEW YORK, N. Y.

FRUIT-RECEPTACLE.

SPECIFICATION forming part of Letters Patent No. 282,215, dated July 31, 1883.

Application filed March 21, 1883. (No model.)

*To all whom it may concern:*

Be it known that I, JOSEPH OWEN, a citizen of the United States, residing at New York, in the county and State of New York, have invented a certain new and useful Improvement in Fruit-Receptacles, of which the following is a full, clear, and exact description, reference being had to the accompanying drawings, forming part of the same.

My invention relates to improvements in that class of vessels or receptacles which are designed more especially for use in gathering or picking fruit; and the objects of my improvements are, first, to provide means whereby the contents of the receptacle can be expelled from the bottom, and, second, to afford facilities for automatically closing and securing the parts of the vessel together after the removal of its contents. These objects I accomplish by the devices shown in the accompanying drawings, in which—

Figure 1:
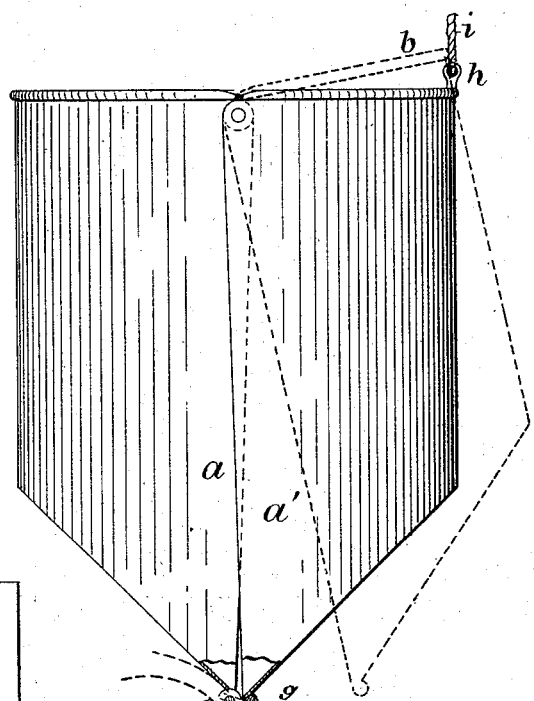
Figure 3:
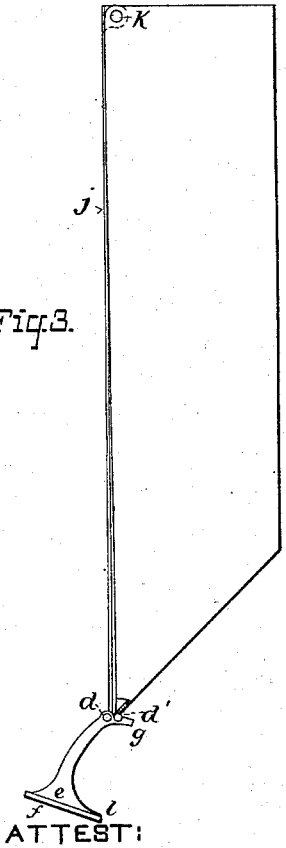
Figure 2:
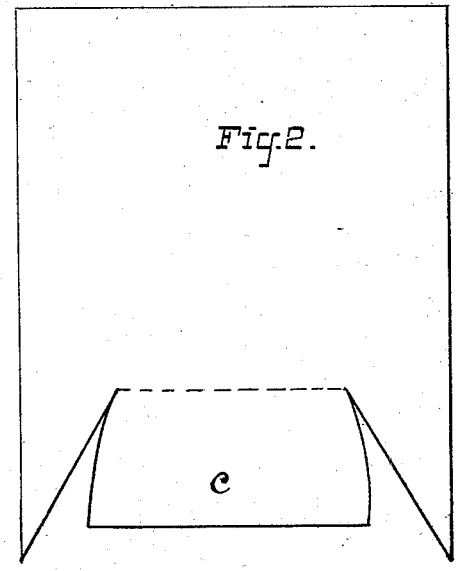

Figure 1 is an end view of my improved receptacle, the lower portion being broken away to show the position of the retaining-latch. Fig. 2 represents the blank as cut to form one half of the receptacle; and Fig. 3 is a side elevation of a modified form of receptacle, the two parts being secured together by the locking device.

In carrying out my invention I construct the receptacle of two parts, each part made in one piece, bent into shape to form the sides and bottom, and the parts pivoted together at the top, and capable of swinging apart, so as to allow of the contents of the receptacle being emptied out from the bottom.

Referring to Fig. 1, $a$ $a'$ represent the two parts or sections which compose the vessel, and $b$ the bail, the ends of which pass through the top portion of each part, the edges of which overlap each other for that purpose, securing them together at this point and serving as the pivot on which they swing. Each part $a$ $a'$ is cut from a single piece of material, preferably sheet-tin, in the shape shown in Fig. 2, and bent into shape as desired, and the bottom is formed by bending downward and inward on the dotted line the part $c$, so that the two lower edges come into close proximity with each other. Within a lap formed on the bottom edge is inserted, in each part, a stout wire, $d$ $d'$. This gives rigidity to this part of the vessel, and also serves as a means of supporting and retaining the locking mechanism.

$e$ represents the locking-arm, which is hung on the wire $d$ at its upper end and swings freely thereon, the material forming the vessel being cut away sufficiently to allow it free play. It is cast in one piece, with a broad base portion, $f$, out of metal suitable for the purpose, and is provided at its upper end with a latch-shaped extremity, $g$, adapted to take over or engage the wire $d'$ in the bottom edge of the other section, a portion of the wire being exposed for this purpose. This is clearly shown in Fig. 1, the full lines representing it locked. To the top edge of the section $a'$ is attached a hook, $h$, having a string, $i$, by which the receptacle can be suspended from a tree or otherwise, as desired.

In Fig. 3 is shown a modified form of receptacle, where, instead of two sections having a rounded or convex shape, one is flat, as indicated at $j$. In many cases this shape is found to be more desirable than the other. With this shape a pin, $k$, is used for holding the sections together at the top.

Referring to Fig. 1, the full lines represent the receptacle closed at the bottom and the two parts locked together, while its open position is shown by the dotted lines, with the locking device disengaged and swung downward.

The operation of the device is automatic, and is as follows: The vessel or receptacle being filled, it is lowered by the string $i$ until the arm $e$ comes into contact with the ground or other receptacle which is to receive the fruit. As the point $l$ of the base portion receives the pressure from such contact, the arm $e$ is forced backward, releasing its latched end, and the section $a'$ is extended more or less, as desired, to permit the contents of the receptacle to escape. By taking hold of the bail $b$ the locking device is easily sprung back into position by a slight jerking movement.

It is obvious that a great saving in time and labor is effected in the use of my improved device, as it is not necessary that the fruit-gatherer should leave his position in a tree in order to empty the vessel when it is filled.

I am aware that receptacles have heretofore been made in sections and provided with an automatic locking device, and such I do not claim, broadly, as my invention.

What I claim as new, and desire to secure by Letters Patent, is—

1. A fruit-receptacle composed of the two sections $a$ $a'$, pivoted together at the top edge, as shown, hook $h$, cord $i$, and locking device $e$, arranged on the bottom, whereby the sections are both locked and unlocked automatically, as set forth.

2. The combination, with a receptacle adapted to be opened and closed at the bottom, of the locking device $e$, having the latch-shaped end $g$ and broad base portion $f$, the whole being cast in one piece, with the wire rods $d$ $d'$ arranged in the edge of the bottom part of each section, for suspending and engaging said locking device, substantially as set forth.

JOSEPH OWEN.

Witnesses:
 T. F. W. DEAMES,
 E. T. SMITH.